(12) United States Patent
Khoshnevisan et al.

(10) Patent No.: US 12,477,532 B2
(45) Date of Patent: Nov. 18, 2025

(54) TIME GAPS BETWEEN PHYSICAL UPLINK SHARED CHANNEL REPETITIONS

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US); Fang Yuan, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 376 days.

(21) Appl. No.: 18/006,671

(22) PCT Filed: Oct. 3, 2020

(86) PCT No.: PCT/CN2020/119801
§ 371 (c)(1),
(2) Date: Jan. 24, 2023

(87) PCT Pub. No.: WO2022/067867
PCT Pub. Date: Apr. 7, 2022

(65) Prior Publication Data
US 2023/0292312 A1    Sep. 14, 2023

(51) Int. Cl.
*H04W 72/1268*    (2023.01)
*H04L 1/1867*    (2023.01)
*H04W 72/232*    (2023.01)

(52) U.S. Cl.
CPC ......... *H04W 72/1268* (2013.01); *H04L 1/189* (2013.01); *H04W 72/232* (2023.01)

(58) Field of Classification Search
None
See application file for complete search history.

(56) References Cited

U.S. PATENT DOCUMENTS

| | | | |
|---|---|---|---|
| 2019/0045525 A1* | 2/2019 | Shi | H04L 5/0053 |
| 2019/0174341 A1* | 6/2019 | Chincholi | H04B 17/336 |

(Continued)

FOREIGN PATENT DOCUMENTS

| | | |
|---|---|---|
| CN | 110611958 A | 12/2019 |
| WO | 2020167014 A1 | 8/2020 |

OTHER PUBLICATIONS

Huawei, et al., "Corrections on the Capabilities Associated with Multiple Bands/Cells", R2-2008430, 3GPP TSG-RAN WG2Meeting #111, Electronic, Aug. 17-28, 2020, the Whole Document, 8 Pages.

(Continued)

*Primary Examiner* — Clemence S Han
(74) *Attorney, Agent, or Firm* — Harrity & Harrity, LLP

(57) ABSTRACT

Various aspects of the present disclosure generally relate to wireless communication. In some aspects, a user equipment (UE) may receive at least one downlink control information message that schedules multiple sets of repetitions of a physical uplink shared channel transmission with different sets of transmission parameters. The scheduled repetitions of the multiple sets of repetitions may be transmitted consecutively. The UE may transmit one or more of the scheduled repetitions of the multiple sets of repetitions using one or more time gaps between the scheduled repetitions of the multiple sets of repetitions. Numerous other aspects are provided.

34 Claims, 8 Drawing Sheets

(56) References Cited

U.S. PATENT DOCUMENTS

| | | | |
|---|---|---|---|
| 2019/0230683 A1 | 7/2019 | Akkarakaran et al. | |
| 2019/0319823 A1 | 10/2019 | Akkarakaran et al. | |
| 2020/0052827 A1 | 2/2020 | Vilaipornsawai et al. | |
| 2020/0136770 A1 | 4/2020 | Khoshnevisan et al. | |
| 2020/0221478 A1 | 7/2020 | Fakoorian et al. | |
| 2020/0314817 A1 | 10/2020 | Sun et al. | |
| 2021/0377979 A1* | 12/2021 | Bhamri | H04W 72/0446 |
| 2021/0385834 A1* | 12/2021 | Morozov | H04W 72/23 |
| 2022/0052779 A1* | 2/2022 | Ye | H04W 72/23 |
| 2022/0124707 A1 | 4/2022 | Bae et al. | |
| 2022/0287053 A1* | 9/2022 | Beale | H04W 28/18 |
| 2023/0007651 A1* | 1/2023 | Shi | H04W 72/0446 |
| 2023/0124582 A1* | 4/2023 | Frenne | H04L 5/0012 |
| | | | 370/329 |
| 2023/0319816 A1* | 10/2023 | Ali | H04L 27/26025 |
| | | | 370/329 |

OTHER PUBLICATIONS

International Search Report and Written Opinion—PCT/CN2020/119801—ISA/EPO—Jul. 2, 2021.

Apple Inc: "Remaining Issues on PUSCH Enhancements for eURLLC", 3GPP TSG RAN WG1 #101-e, R1-2004223, 3rd Generation Partnership Project, Mobile Competence Centre, 650, Route Des Lucioles, F-06921 Sophia-Antipolis Cedex, France, vol. RAN WG1, No. e-Meeting, May 25, 2020-Jun. 5, 2020, May 16, 2020, 13 Pages, XP052345602, p. 3, text above section 2.2, p. 6, section 2.3, Agreement 2, p. 6, section 2.3, Agreement 3, p. 7, box above section 2.4.

Supplementary European Search Report—EP20955887—Search Authority—The Hague—Jun. 19, 2024.

Apple Inc: "Remaining Issues on PUSCH Enhancements for eURLLC", R1-2004223, 3GPP TSG RAN WG1 #101-e e-Meeting, May 25-Jun. 5, 2020, May 16, 2020, 13 Pages.

\* cited by examiner

TIME GAPS BETWEEN PHYSICAL UPLINK SHARED CHANNEL REPETITIONS

CROSS-REFERENCE TO RELATED APPLICATION

This Patent Application is a 371 national stage of PCT Application No. PCT/CN2020/119801 filed on Oct. 3, 2020, entitled "TIME GAPS BETWEEN PHYSICAL UPLINK SHARED CHANNEL REPETITIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for time gaps between physical uplink shared channel (PUSCH) repetitions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving at least one downlink control information (DCI) message that schedules multiple sets of repetitions of a physical uplink shared channel transmission with different sets of transmission parameters, wherein scheduled repetitions of the multiple sets of repetitions are to be transmitted consecutively; and transmitting one or more of the scheduled repetitions of the multiple sets of repetitions using one or more time gaps between the scheduled repetitions of the multiple sets of repetitions.

In some aspects, a UE for wireless communication includes a memory and one or more processors operatively coupled to the memory, the memory and the one or more processors configured to: receive at least one DCI message that schedules multiple sets of repetitions of a physical uplink shared channel transmission with different sets of transmission parameters, wherein scheduled repetitions of the multiple sets of repetitions are to be transmitted consecutively; and transmit one or more of the scheduled repetitions of the multiple sets of repetitions using one or more time gaps between the scheduled repetitions of the multiple sets of repetitions.

In some aspects, a non-transitory computer-readable medium storing a set of instructions for wireless communication includes one or more instructions that, when executed by one or more processors of a UE, cause the UE to: receive at least one DCI message that schedules multiple sets of repetitions of a physical uplink shared channel transmission with different sets of transmission parameters, wherein scheduled repetitions of the multiple sets of repetitions are to be transmitted consecutively; and transmit one or more of the scheduled repetitions of the multiple sets of repetitions using one or more time gaps between the scheduled repetitions of the multiple sets of repetitions.

In some aspects, an apparatus for wireless communication includes means for receiving at least one DCI message that schedules multiple sets of repetitions of a physical uplink shared channel transmission with different sets of transmission parameters, wherein scheduled repetitions of the multiple sets of repetitions are to be transmitted consecutively; and means for transmitting one or more of the scheduled repetitions of the multiple sets of repetitions using one or more time gaps between the scheduled repetitions of the multiple sets of repetitions.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
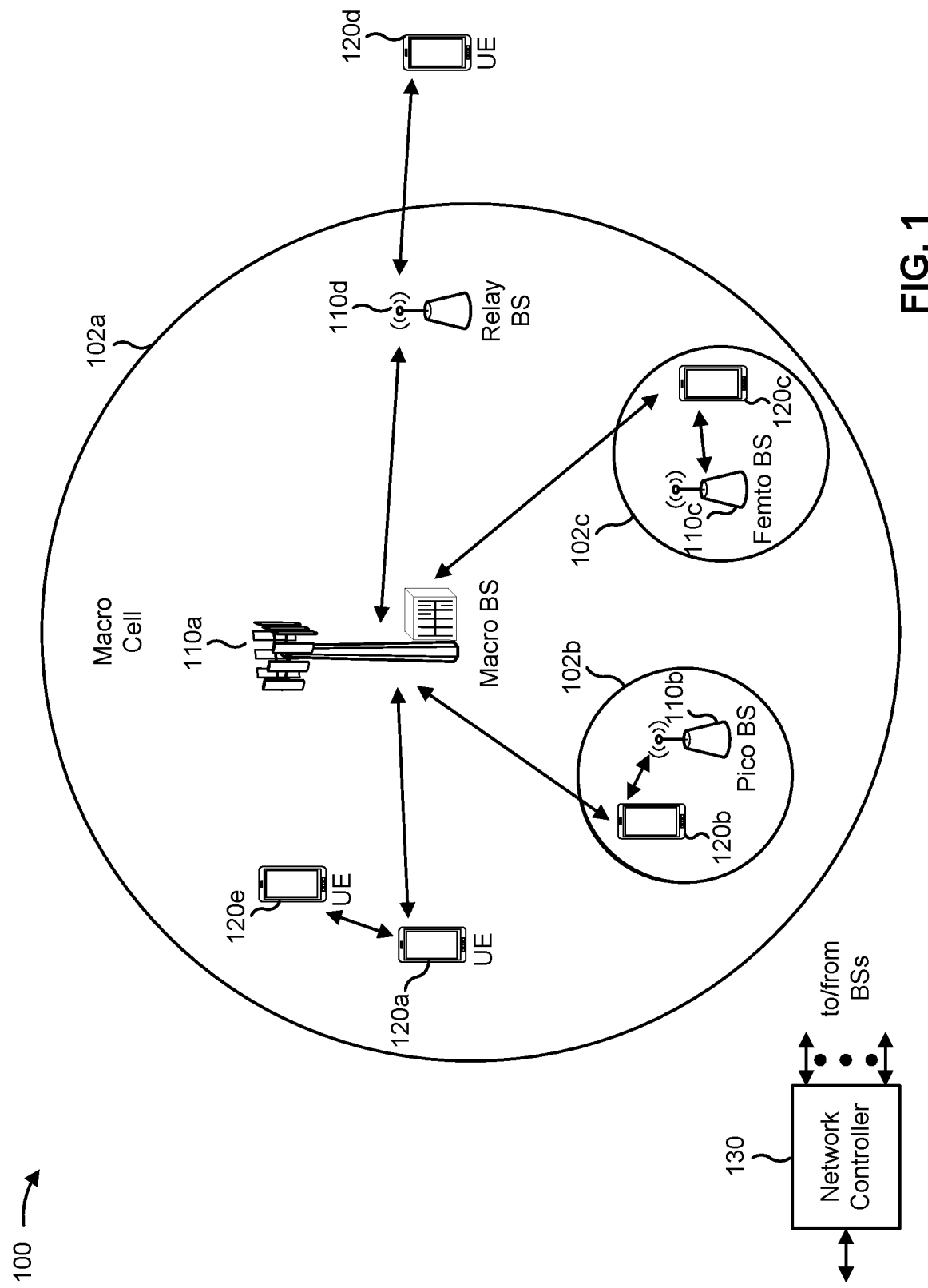
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
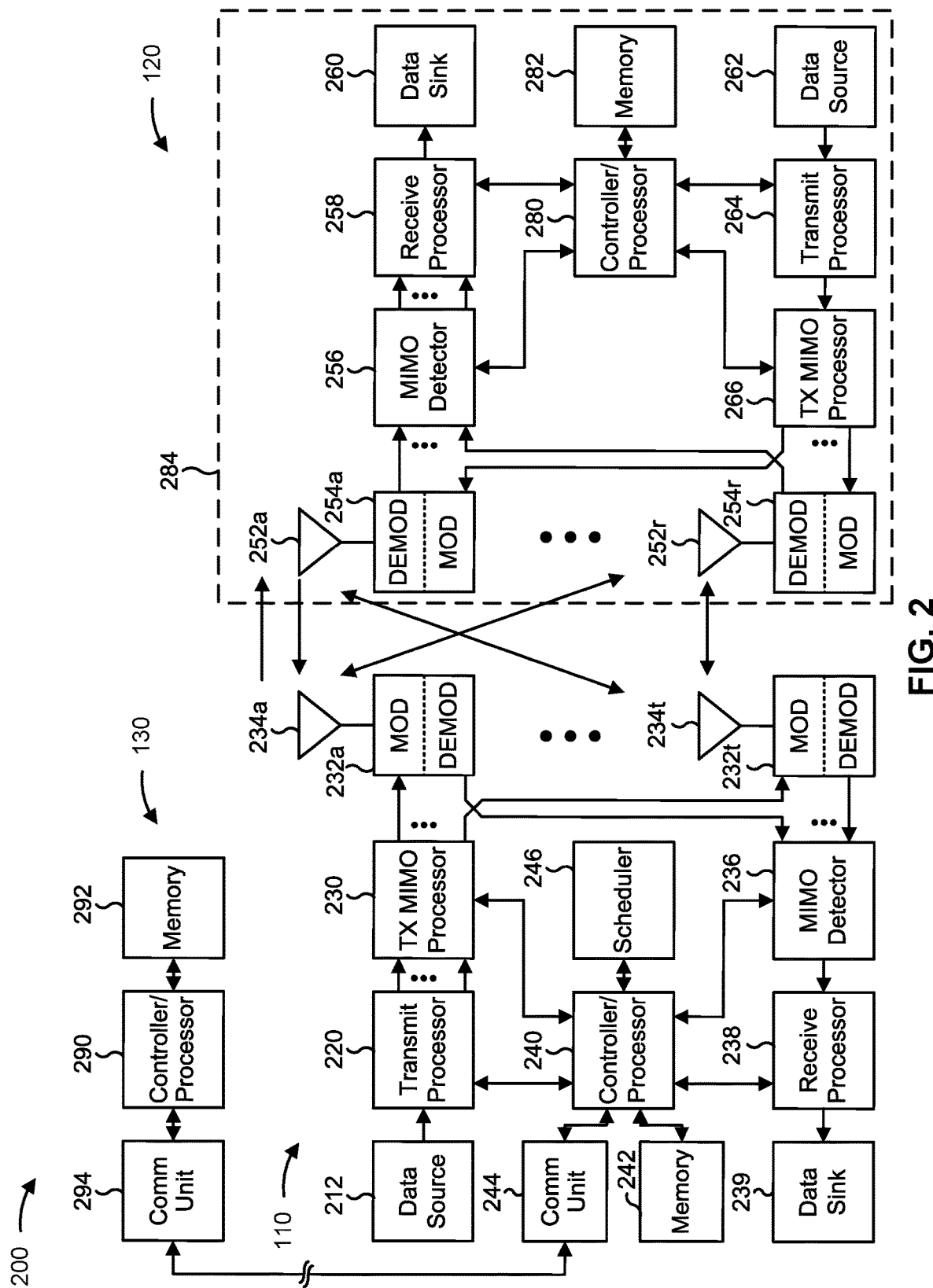
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-7.

Controller/processor 240 of base station 110, controller/processor 280 of UE 120, and/or any other component(s) of FIG. 2 may perform one or more techniques associated with time gaps between physical uplink shared channel (PUSCH) repetitions, as described in more detail elsewhere herein. For example, controller/processor 240 of base station 110, controller/processor 280 of UE 120, and/or any other component(s) of FIG. 2 may perform or direct operations of, for example, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7, and/or other processes as described herein. In some aspects, executing instructions may include running the instructions, converting the instructions, compiling the instructions, interpreting the instructions, and/or the like.

In some aspects, a UE includes means for receiving at least one downlink control information (DCI) message that schedules multiple sets of repetitions of a PUSCH transmission with different sets of transmission parameters, where scheduled repetitions of the multiple sets of repetitions are to be transmitted consecutively; and/or means for transmitting one or more of the scheduled repetitions of the multiple sets of repetitions using one or more time gaps between the scheduled repetitions of the multiple sets of repetitions. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE includes means for determining a duration for the one or more time gaps.

In some aspects, the UE includes means for receiving, via radio resource control signaling, a configuration that indicates a duration for the one or more time gaps.

In some aspects, the UE includes means for determining locations for the one or more time gaps.

In some aspects, the UE includes means for determining a first duration for the one or more time gaps for the first set of repetitions based at least in part on a first control resource set (CORESET) pool index, and a second duration for the one or more time gaps for the second set of repetitions based at least in part on a second CORESET pool index.

In some aspects, the UE includes means for receiving, via radio resource control signaling, a configuration that indicates a first duration for the one or more time gaps for the first CORESET pool index, and a second duration for the one or more time gaps for the second CORESET pool index.

In some aspects, the UE includes means for determining the first duration based at least in part on the first indication and the first CORESET pool index, and the second duration based at least in part on the second indication and the second CORESET pool index.

In some aspects, the UE includes means for receiving an indication of locations for the one or more time gaps in the first set of repetitions and the second set of repetitions.

In some aspects, the UE includes means for receiving an indication of respective durations for the one or more time gaps for each pair of consecutive scheduled repetitions of the first set of repetitions and the second set of repetitions.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
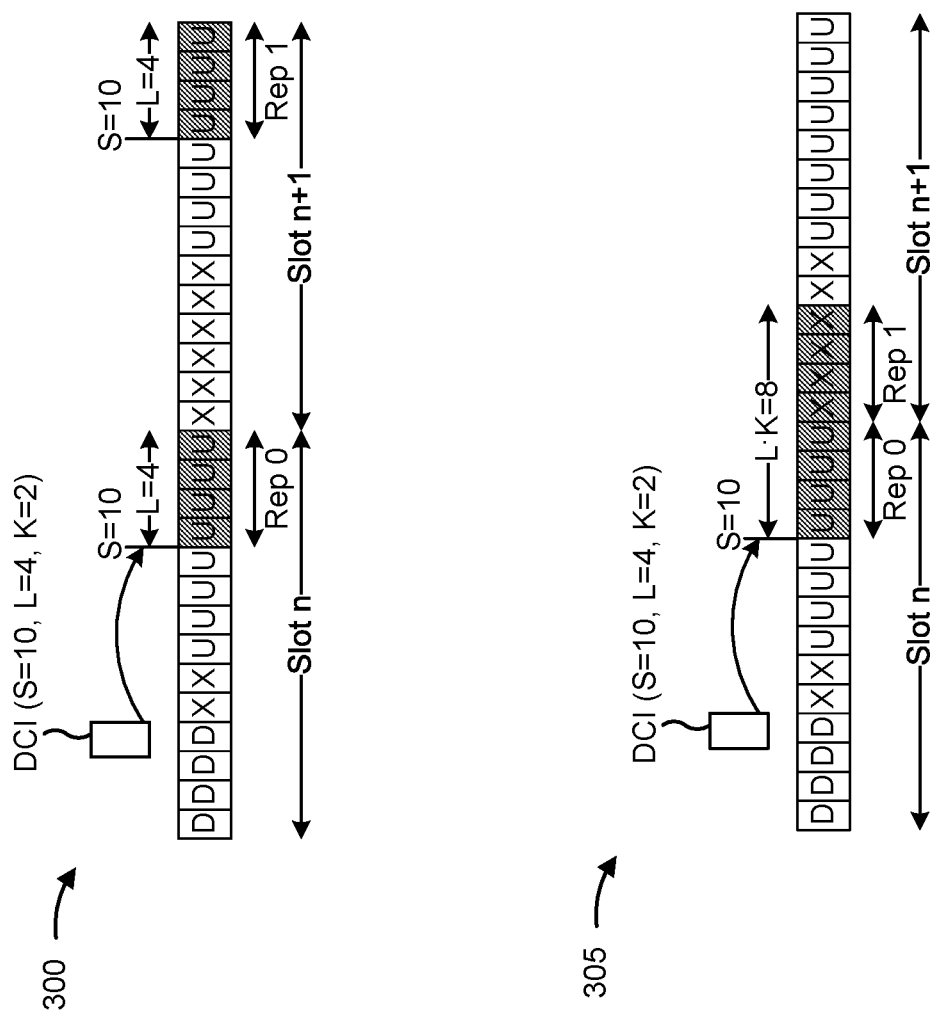
FIG. 3 is a diagram illustrating examples of physical uplink repetition types, in accordance with various aspects of the present disclosure.

FIG. 3 is a diagram illustrating examples 300 and 305 of physical uplink repetition types, in accordance with various aspects of the present disclosure. In particular, examples 300 and 305 are examples of different types of PUSCH repetition, which may be used for dynamic grants or configured grants. The different types of PUSCH repetition of examples 300 and 305 may be used for ultra-reliable low-latency communication (URLLC). In some aspects, PUSCH repetitions may be defined according to a start and length indicator value (SLIV), which indicates a starting symbol (S) for a repetition and a length (L) of a repetition (e.g., a quantity of symbols for a repetition), and a quantity of repetitions (K).

Example 300 is an example of PUSCH repetition Type A. In PUSCH repetition Type A, the same SLIV may be used for each repetition in a slot across K consecutive slots (e.g., when K>1). PUSCH repetition Type A may use dynamic indication of the quantity of repetitions (e.g., in a time domain resource allocation (TDRA) field of DCI), or semi-static configuration of the quantity of repetitions (e.g., in a radio resource control (RRC) configuration).

Example 305 is an example of PUSCH repetition Type B. In PUSCH repetition Type B, K nominal repetitions, each repetition having a nominal length L, are scheduled (e.g., in DCI) back-to-back (e.g., consecutively, without a time gap between the repetitions) starting from symbol S, where S and L are indicated by a SLIV. In PUSCH repetition Type B, the scheduled repetitions are referred to as "nominal repetitions" and the indicated length of a repetition is referred to as a "nominal length," because an actual quantity of repetitions that are transmitted or an actual length of a repetition that is used may differ from the indicated quantity of nominal repetitions or the indicated nominal length of a repetition, as described below in connection with FIG. 4.

As indicated above, FIG. 3 provides examples. Other examples may differ from what is described with regard to FIG. 3.

Figure 4:
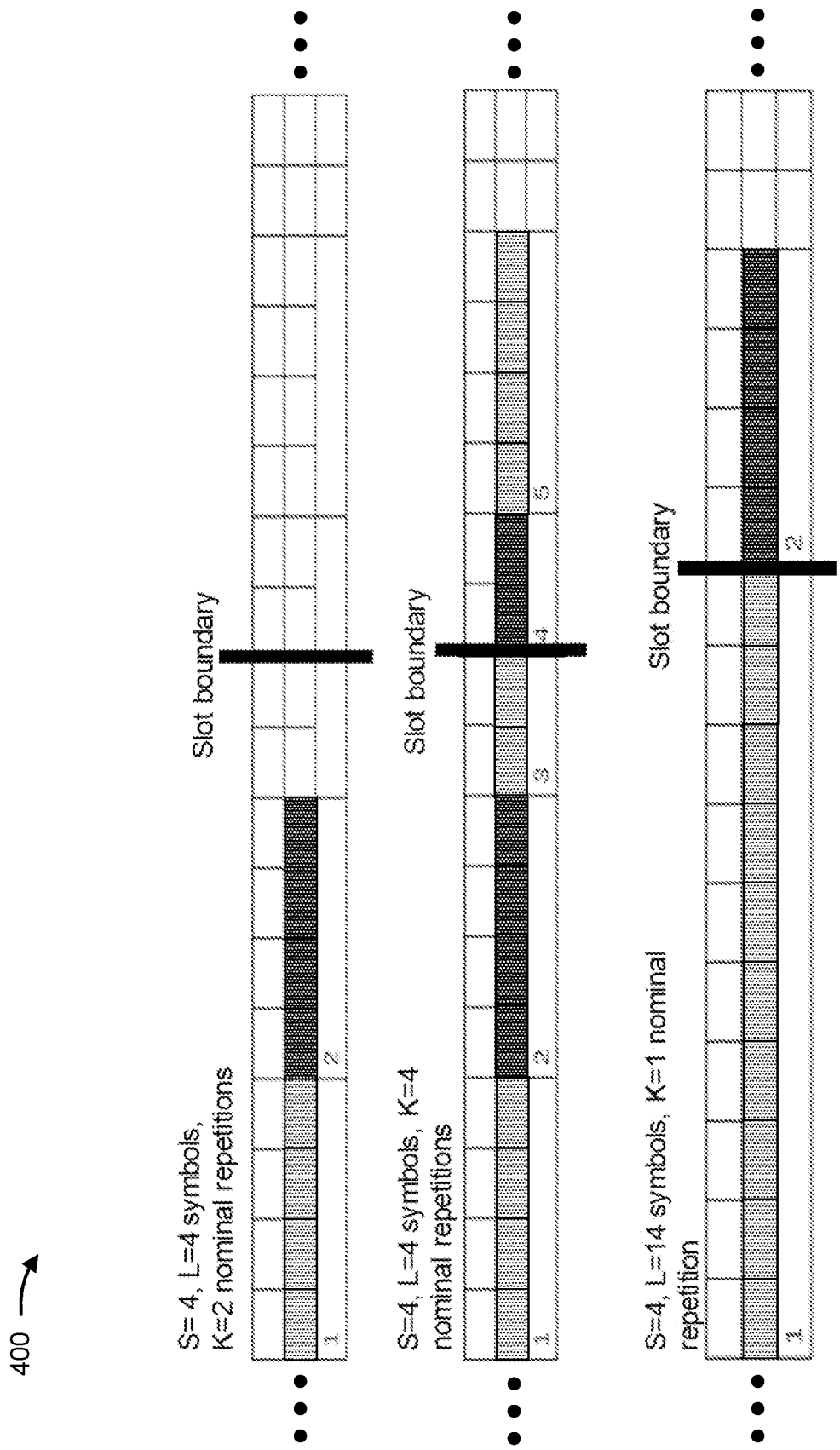
FIG. 4 is a diagram illustrating an example of physical uplink repetitions, in accordance with various aspects of the present disclosure.

FIG. 4 is a diagram illustrating an example 400 of physical uplink repetitions, in accordance with various aspects of the present disclosure. Example 400 shows Type B PUSCH repetitions. As described above, a UE may receive an indication (e.g., in DCI) of a quantity of nominal repetitions, of the same length, that are to be transmitted by the UE.

In some aspects, the quantity of actual repetitions transmitted by the UE may be different from the indicated quantity of nominal repetitions. In some aspects, the actual repetitions transmitted by the UE may be different lengths. This may be a result of slot boundaries or invalid symbols. For example, when a nominal repetition crosses a slot boundary, the nominal repetition may be divided into two actual repetitions. As another example, when a nominal repetition is in "invalid symbols," the nominal repetition may be divided into multiple actual repetitions that avoid the invalid symbols. In some aspects, an invalid symbol may be a downlink symbol (e.g., configured semi-statically for the UE), an indicated symbol of a pattern of invalid symbols, a symbol for synchronization signal block (SSB) reception, or a symbol for monitoring a PDCCH (e.g., a symbol of a control resource set (CORESET) 0 for Type0-PDCCH monitoring), among other examples.

Example 400 shows three groups of repetitions: a top group, a middle group, and a bottom group. In the top group, two nominal repetitions with a length L of 4 symbols are scheduled. The top group shows two repetitions, where a first repetition has a length L of 4 symbols and a second repetition has a length L of 4 symbols. Thus, the first slot has an actual quantity of 2 repetitions. In the middle group, four nominal repetitions with a length L of 4 symbols are scheduled. The middle group has two actual repetitions in the first slot, of 4 symbols each, but due to a slot boundary, the first slot has a third actual repetition of 2 symbols. The second slot has a fourth actual repetition of 2 symbols and a fifth actual repetition of 4 symbols. In the bottom group, one nominal repetition with a length L of 14 symbols is scheduled. The bottom group has one actual repetition of 10 symbols that fills up the first slot (starting from symbol index 4). The second slot starts with an actual repetition of 4 symbols. In other words, because of slot boundaries, a quantity of actual repetitions may be different from a quantity of nominal repetitions, and repetitions may be of different lengths.

Current wireless networks generally lack support for multiple sets of Type B PUSCH repetitions that are associated with different sets of transmission parameters. In some cases, a UE may be unable to consecutively transmit, to a base station, repetitions for multiple sets of nominal repetitions using different sets of transmission parameters. For example, the UE may require a switching time for switching between the different sets of transmission parameters (e.g., switching between different uplink beams, uplink transmit powers, and/or precodings, among other examples), which may not be available when the repetitions are transmitted consecutively. Accordingly, transmissions of the UE may lack spatial diversity, thereby impairing a performance of the transmissions and resulting in retransmissions, additional consumption of network resources, and/or additional consumption of processing resources of the UE and/or the base station, among other examples.

In addition, the multiple sets of nominal repetitions may be scheduled by separate DCIs. Here, a first set of repetitions scheduled by a first DCI may be consecutive and a second set of repetitions scheduled by a second DCI may be consecutive. Thus, the first set of repetitions and the second set of repetitions are not interlaced (i.e., interleaved) and lack spatial/time diversity, thereby impairing a performance of the transmissions, as described above.

Some techniques and apparatuses described herein enable a UE to transmit multiple sets of Type B PUSCH repetitions using different sets of transmission parameters. For example, the UE may transmit one or more repetitions of multiple sets of nominal repetitions using one or more time gaps. In some aspects, the multiple sets of nominal repetitions may be scheduled by a single DCI, and the DCI or a radio resource control (RRC) configuration may provide an indication of a quantity of symbols for use as a time gap. The time gaps may be used between consecutive nominal repetitions, or between consecutive nominal repetitions that use different sets of transmission parameters. In some aspects, the multiple sets of nominal repetitions may be scheduled by respective (e.g., multiple) DCIs, and the UE may receive separate indications (e.g., in the respective DCIs and/or in one or more RRC configurations) of time gaps for the sets of nominal repetitions. A duration of the time gaps for one set of repetitions may correspond to a duration of a repetition for another set of repetitions, and may further include a duration for beam switching. This may enable interleaving the one set of repetitions with the other set of repetitions.

In this way, the UE may transmit Type B PUSCH repetitions using different sets of transmission parameters (e.g., different beams). Accordingly, diversity (e.g., spatial diversity and/or time diversity) of the repetitions may be improved, thereby reducing retransmissions and conserving network resources and processing resources associated with retransmissions.

As indicated above, FIG. 4 is provided as an example. Other examples may differ from what is described with regard to FIG. 4.

Figure 5:
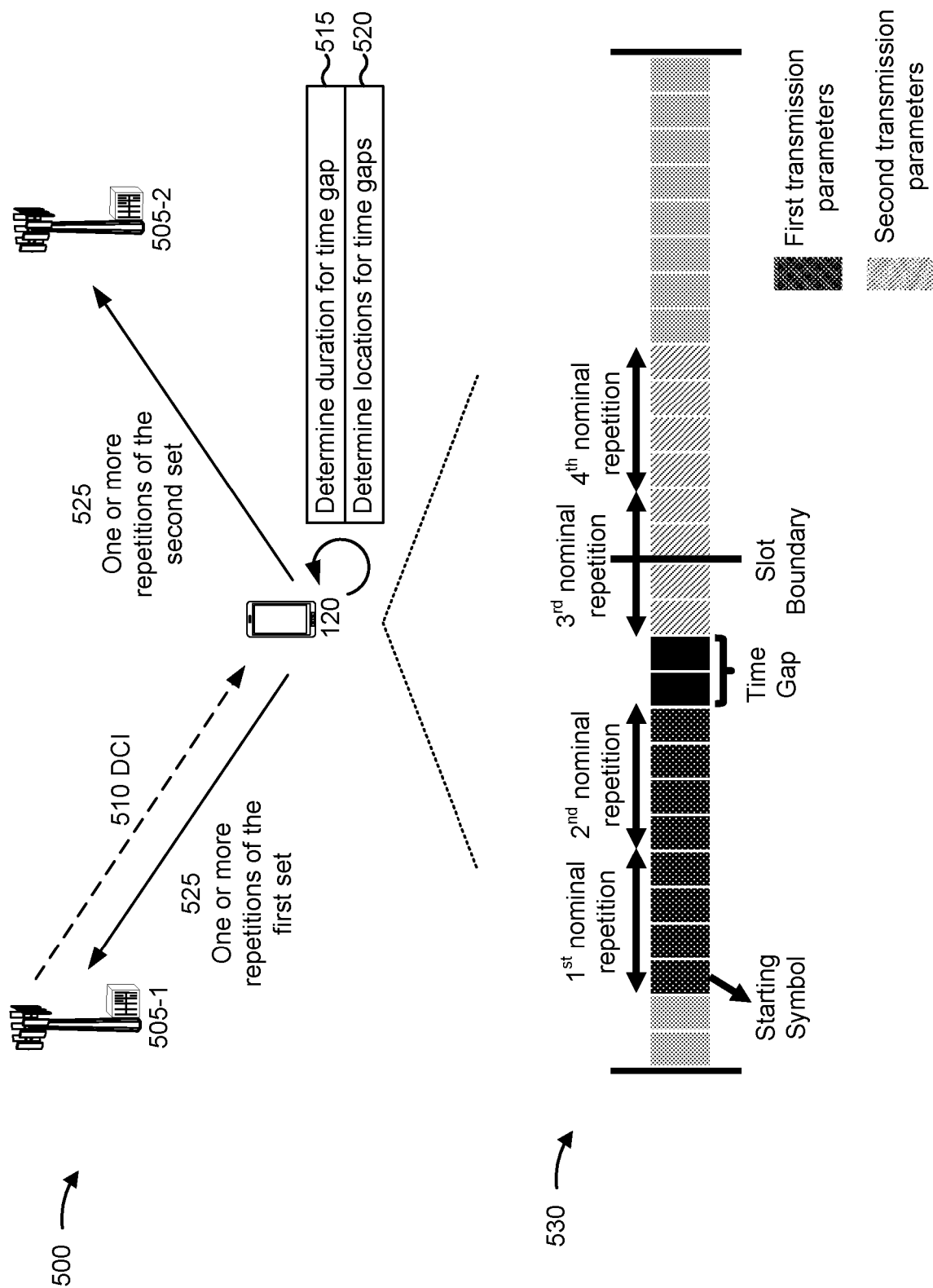
FIGS. 5-6 are diagrams illustrating examples associated with time gaps between physical uplink shared channel (PUSCH) repetitions, in accordance with various aspects of the present disclosure.

FIG. 5 is a diagram illustrating an example 500 associated with time gaps between PUSCH repetitions, in accordance with various aspects of the present disclosure. As shown in FIG. 5, example 500 includes communication between a UE 120 and multiple TRPs 505 (shown as a first TRP 505-1 and a second TRP 505-2). In some aspects, the UE 120 and the TRPs 505 may be included in a wireless network, such as the wireless network 100. The UE 120 may communicate with a TRP 505 on a wireless access link, which may include an uplink and a downlink. In some aspects, each TRP 505 may correspond to, may be implemented by, or may be included in, a respective base station 110. In some aspects, the multiple TRPs 505 may be implemented by, or may be included in, the same base station 110.

As shown by reference number 510, the UE 120 may receive a DCI message. For example, the UE 120 may receive a single DCI message from the first TRP 505-1 or the second TRP 505-2 (or another TRP or base station). The DCI message may schedule a first set of repetitions of a PUSCH transmission (e.g., a transport block) and a second set of repetitions of the PUSCH transmission. The first set of repetitions may include a first quantity of nominal repetitions and the second set of repetitions may include a second quantity of nominal repetitions. The first set of repetitions and the second set of repetitions may be Type B PUSCH repetitions, as described above. That is, the DCI message may schedule the first set of repetitions and the second set of repetitions to be transmitted consecutively (e.g., without time gaps between repetitions).

The DCI message may indicate a first set of transmission parameters for transmitting the first set of repetitions and a second set of transmission parameters for transmitting the second set of repetitions (e.g., the repetitions may be for transmissions to multiple TRPs). The first set of transmission parameters and the second set of transmission parameters may be different (e.g., may differ by at least one transmission parameter). A set of transmission parameters may identify an uplink beam, a precoding, and/or a set of uplink power control parameters, among other examples. Accordingly, in some aspects, the first set of transmission parameters and the second set of transmission parameters may identify different uplink beams, different precodings, and/or different power control parameters. While example 500 will be described in terms of a first set of repetitions and a second set of repetitions, any number of multiple sets of repetitions scheduled with different respective sets of transmission parameters is contemplated.

As shown by reference number 515, the UE 120 may determine a duration for a time gap that is to be used between repetitions (e.g., between nominal repetitions scheduled by the DCI message). In some aspects, the duration for the time gap may be a quantity of OFDM symbols. The UE 120 may determine a time domain resource allocation (TDRA) for the first set of repetitions and the second set of repetitions based at least in part on one or more time gaps that are to be located between repetitions.

In some aspects, the UE 120 may determine the duration for the time gap based at least in part on a configuration. For example, the UE 120 may receive a configuration that indicates the duration (e.g., a quantity of OFDM symbols) for the time gap. The UE 120 may receive the configuration via RRC signaling. The UE 120 may receive the configuration from the first TRP 505-1 or the second TRP 505-2. In some aspects, the UE 120 may determine that no time gap is to be used (e.g., the duration for the time gap is zero symbols) if the configuration does not configure a parameter (e.g., an RRC parameter) for the duration of the time gap.

Additionally, or alternatively, the UE 120 may determine the duration for the time gap based at least in part on an indication of the duration included in the DCI message received by the UE 120. In some aspects, the indication is provided in a field of the DCI message. In some aspects, the field is designated for indicating the duration. In some aspects, the field is a TDRA field of the DCI message. In this example, a TDRA identifier (e.g., a row index of a TDRA table) in the TDRA field may indicate the duration. Here, the UE 120 may be configured with a TDRA table, and each row of the TDRA table may identify a particular duration (e.g., a particular quantity of OFDM symbols). In addition, each row may identify a slot offset, a starting symbol, a PUSCH duration per repetition, and/or a quantity of repetitions.

In some aspects, the UE 120 may receive a configuration for a DCI format that indicates whether DCI messages for the DCI format are to include an indication of the duration (e.g., in a field designated for indicating the duration or in a TDRA field). For example, whether the indication is to be included in DCI may be separately configured for DCI formats 0_1 and 0_2.

As shown by reference number 520, the UE 120 may determine locations for the time gaps that are to be used between repetitions (e.g., between nominal repetitions scheduled by the DCI message). In some aspects, the UE 120 may determine the locations based at least in part on a configuration (e.g., an RRC configuration) and/or an indication in the DCI message, as described above.

In some aspects, a time gap may be located between consecutive repetitions (e.g., consecutive nominal repetitions) of the first set of repetitions and the second set of repetitions. That is, time gaps may be located between each pair of consecutive repetitions scheduled for the UE 120. In some aspects, a time gap may be located between consecutive repetitions (e.g., consecutive nominal repetitions) of the first set of repetitions and the second set of repetitions that are associated with different sets of transmission parameters. That is, time gaps may be located between each pair of consecutive repetitions that are scheduled with different sets of transmission parameters. For example, a time gap may be located between a repetition of the first set of repetitions (e.g., that use the first set of transmission parameters) and a repetition of the second set of repetitions (e.g., that use the second set of transmission parameters) that are to be transmitted consecutively.

In some aspects, a base station 110 (e.g., a TRP 505) may determine the duration for time gaps and/or the locations for time gaps. Thus, the base station 110 (e.g., a TRP 505) may transmit a configuration (e.g., an RRC configuration) and/or transmit the DCI message indicating the duration and/or the locations based at least in part on determining the duration and/or the locations.

As shown by reference number 525, the UE 120 may transmit one or more repetitions of the first set of repetitions and the second set of repetitions. That is, the UE 120 may transmit scheduled nominal repetitions of the first set of repetitions and the second set of repetitions as one or more actual repetitions. The UE 120 may transmit repetitions of the first set of repetitions using the first set of transmission parameters (e.g., using a first beam, a first precoding, and/or first uplink power control parameters) and transmit repetitions of the second set of repetitions using the second set of transmission parameters (e.g., using a second beam, a second precoding, and/or second uplink power control parameters). The UE 120 may transmit repetitions of the first set of repetitions to the first TRP 505-1, and transmit repetitions of the second set of repetitions to the second TRP 505-2.

The UE 120 may transmit the one or more repetitions of the first set of repetitions and the second set of repetitions using one or more time gaps. For example, the time gaps may have the durations and the locations determined by the UE 120, as described above.

Reference number 530 shows an example of transmission of one or more repetitions of the first set of repetitions and the second set of repetitions using one or more time gaps. In this example, the DCI message scheduled four repetitions (e.g., nominal repetitions) each with a length of four symbols, and the first two scheduled repetitions (e.g., the first set of repetitions) are associated with the first set of transmission parameters (e.g., a first beam) and the second two scheduled repetitions (e.g., the second set of repetitions) are associated with the second set of transmission parameters (e.g., a second beam). In this example, the UE 120 may determine a time gap of two symbols. As described above, the UE 120 may determine that the time gap is located between consecutively scheduled repetitions (e.g., consecutive nominal repetitions) that use different sets of transmission parameters. For example, the time gap is between the second nominal repetition and the third nominal repetition, as shown. Accordingly, the UE 120 may consecutively transmit the first repetition and the second repetition, followed by the time gap, before transmitting the third repetition. As shown, a nominal repetition that crosses a slot boundary may be transmitted as multiple actual repetitions, as described above.

As indicated above, FIG. 5 is provided as an example. Other examples may differ from what is described with respect to FIG. 5.

Figure 6:
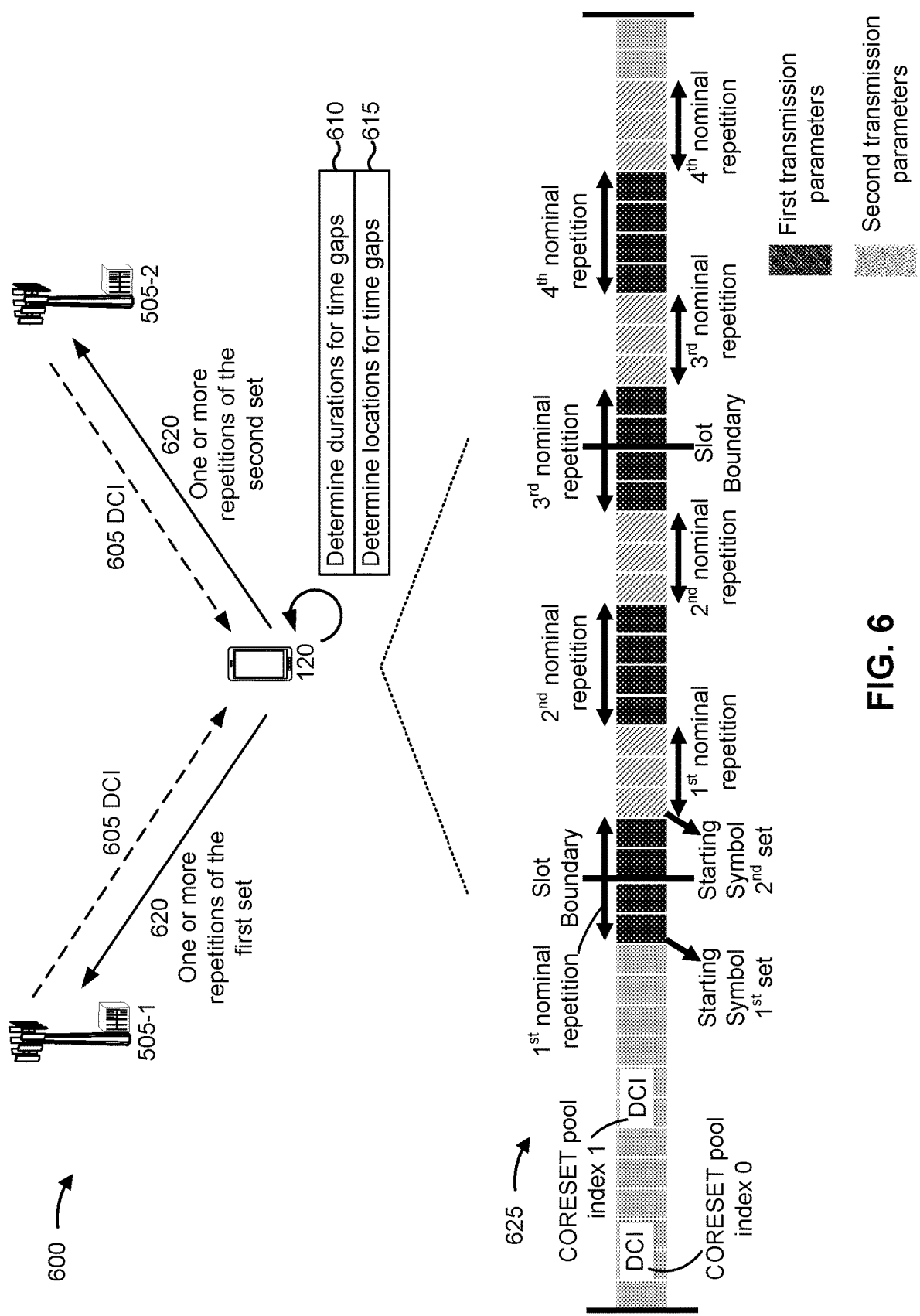

FIG. 6 is a diagram illustrating an example 600 associated with time gaps between PUSCH repetitions, in accordance with various aspects of the present disclosure. As shown in FIG. 6, example 600 includes communication between a UE 120 and multiple TRPs 505 (shown as a first TRP 505-1 and a second TRP 505-2), as described above.

As shown by reference number 605, the UE 120 may receive multiple DCI messages. For example, the UE 120 may receive a first DCI message in a first control resource set (CORESET) and a second DCI message in a second CORESET. The first CORESET may be associated with a first CORESET pool index (e.g., CORESETPoolIndex) value associated with the first TRP 505-1 and the second CORESET may be associated with a second CORESET pool index value associated with the second TRP 505-2. That is, the UE 120 may receive the first DCI message from the first TRP 505-1 (or another TRP or base station) and the second DCI message from the second TRP 505-2 (or another TRP or base station). The first DCI message may schedule a first set of repetitions of a PUSCH transmission, and the second DCI message may schedule a second set of repetitions of the PUSCH transmission, as described above. The first DCI message may schedule the first set of repetitions to be transmitted consecutively and the second DCI message may schedule the second set of repetitions to be transmitted consecutively.

The first DCI message may indicate a first set of transmission parameters for transmitting the first set of repetitions and the second DCI message may indicate a second set of transmission parameters for transmitting the second set of repetitions (e.g., the repetitions may be for transmissions to multiple TRPs). The first set of transmission parameters and the second set of transmission parameters may be different, as described above. While example 600 will be described in terms of a first set of repetitions and a second set of repetitions, any number of multiple sets of repetitions scheduled by respective DCI messages and with different respective sets of transmission parameters is contemplated.

As shown by reference number 610, the UE 120 may determine a first duration for a first time gap that is to be used between repetitions (e.g., between nominal repetitions) of the first set of repetitions scheduled by the first DCI message and a second duration for a second time gap that is to be used between repetitions (e.g., between nominal repetitions) of the second set of repetitions scheduled by the second DCI message. The UE 120 may determine a first TDRA for the first set of repetitions based at least in part on one or more first time gaps that are to be located between repetitions, and determine a second TDRA for the second set of repetitions based at least in part on one or more second time gaps that are to be located between repetitions.

In some aspects, the first duration for the first time gap and the second duration for the second time gap may be respective quantities of OFDM symbols, as described above. In some aspects, the first duration and the second duration may be the same duration or different durations. In some aspects, the first duration may correspond to a duration (e.g., a nominal length) of a repetition (e.g., a nominal repetition) of the second set of repetitions, and the second duration may correspond to a duration of a repetition of the first set of repetitions. The first duration and/or the second duration may include an additional duration for beam switching (e.g., one symbol for switching from a first beam to a second beam, and one symbol for switching from the second beam back to the first beam). For example, if a duration (e.g., a nominal length) of a repetition of the second set of repetitions is 4 symbols, then the first duration for the first time gap may be 6 symbols (e.g., 1+4+1 symbols) to allow for beam switching.

In some aspects, the UE 120 may determine the first duration for the first time gap and the second duration for the second time gap based at least in part on a configuration (e.g., an RRC configuration), as described above. Additionally, or alternatively, the UE 120 may determine the first duration for the first time gap and the second duration for the second time gap based at least in part on indications of the durations included in the first and second DCI messages received by the UE 120 (e.g., in fields designated for indicating duration or in TDRA fields of the DCI messages), as described above.

In some aspects, the UE 120 may determine the durations for the time gaps based at least in part on CORESET pool index values for the CORESETs in which the first and second DCI messages were detected. For example, the UE 120 may determine the first duration for the first time gap based at least in part on the first CORESET pool index value for the first CORESET in which the first DCI message was detected, and determine the second duration for the second time gap based at least in part on the second CORESET pool index value for the second CORESET in which the second DCI message was detected.

In some aspects, the UE 120 may receive a configuration (e.g., via RRC signaling) that configures separate time duration parameters for different CORESET pool index values. For example, the configuration may include a first parameter for the first CORESET pool index value and a second parameter for the second CORESET pool index value. The first parameter may indicate the first time duration (e.g., a quantity of OFDM symbols) for the first time gap and the second parameter may indicate the second time duration for the second time gap.

Additionally, or alternatively, the UE 120 may determine the first duration and the second duration based at least in part on indications of the durations included in the first and second DCI messages received by the UE 120 and on CORESET pool index values. For example, the UE 120 may determine the first duration based at least in part on a value of a field (e.g., a field designated for indicating duration or in a TDRA field) of the first DCI message and the first CORESET pool index value, and determine the second duration based at least in part on a value of a field (e.g., a field designated for indicating duration or in a TDRA field) of the second DCI message and the second CORESET pool index value. As an example, the field of the first DCI message and the field of the second DCI message may both indicate the same value, but the UE 120 may determine that the value indicates a first quantity of symbols in connection with the first CORESET pool index and indicates a second quantity of symbols in connection with the second CORESET pool index. In some aspects, the UE 120 may be configured (e.g., RRC configured) with information (e.g., a table) that the UE 120 may use to identify durations indicated by different combinations of values of the field and CORESET pool index values.

As shown by reference number 615, the UE 120 may determine locations for the time gaps that are to be used between repetitions (e.g., between nominal repetitions scheduled by the first DCI message or the second DCI message). In some aspects, the UE 120 may determine the locations based at least in part on a configuration (e.g., an RRC configuration) and/or an indication in the first DCI message and/or the second DCI message, as described above.

In some aspects, the first time gap may be located between consecutive repetitions (e.g., consecutive nominal repetitions) of the first set of repetitions and the second time gap may be located between consecutive repetitions of the second set of repetitions, as described above. In some aspects, the first time gap may be located between particular consecutive repetitions (e.g., particular consecutive nominal repetitions) of the first set of repetitions and the second time gap may be located between particular consecutive repetitions of the second set of repetitions. For example, the configuration, the first DCI message, and/or the second DCI message may indicate a pattern of locations, or particular locations, for time gaps. As an example, the first DCI message may indicate that the first time gap is to be located between every three consecutive repetitions of the first set of repetitions.

In some aspects, a time gap may be located between consecutive repetitions (e.g., consecutive nominal repetitions) of the first set of repetitions and between consecutive repetitions of the second set of repetitions, and the configuration, the first DCI message, and/or the second DCI message may indicate a particular duration for each time gap. As an example, the first DCI message may indicate, for the first set of repetitions, no time gap between the first and the second nominal repetitions, a 4-symbol time gap between the second and the third nominal repetitions, a 2-symbol time gap between the third and the fourth nominal repetitions, and so forth.

In some aspects, a base station 110 (e.g., a TRP 505) may determine the durations for time gaps and/or the locations for time gaps. Thus, the base station 110 (e.g., a TRP 505) may transmit a configuration (e.g., an RRC configuration) and/or transmit a DCI message indicating the durations and/or the locations based at least in part on determining the durations and/or the locations.

As shown by reference number 620, the UE 120 may transmit one or more repetitions of the first set of repetitions and the second set of repetitions, as described above. The UE 120 may transmit the one or more repetitions of the first set of repetitions and the second set of repetitions using one or more of the first time gaps and/or one or more of the second time gaps. For example, the time gaps may have the durations and the locations determined by the UE 120, as described above.

Reference number 625 shows an example of transmission of one or more repetitions of the first set of repetitions and the second set of repetitions using one or more time gaps. In this example, the first DCI message scheduled four repetitions (e.g., nominal repetitions), each with a length of four symbols (e.g., the first set of repetitions), and the second DCI message scheduled four repetitions (e.g., nominal repetitions), each with a length of three symbols (e.g., the second set of repetitions). Based at least in part on receiving the first DCI in a CORESET configured with a CORESET pool index value of 0 (e.g., associated with the first TRP 505-1), the UE 120 may determine (e.g., based at least in part on an RRC configuration and/or DCI indication, as described above) a first time gap of three symbols (or five symbols if the first time gap is to include a duration for beam switching) for the first set of repetitions. Based at least in part on receiving the second DCI in a CORESET configured with a CORESET pool index value of 1 (e.g., associated with the second TRP 505-2), the UE 120 may determine (e.g., based at least in part on an RRC configuration and/or DCI indication, as described above) a second time gap of four symbols (or six symbols if the second time gap is to include a duration for beam switching) for the second set of repetitions.

As described above, the UE 120 may determine that the first time gap is located between consecutively scheduled repetitions (e.g., consecutive nominal repetitions) of the first set of repetitions, and that the second time gap is located between consecutively scheduled repetitions of the second set of repetitions. For example, the first time gap may be located between the first and second nominal repetitions of the first set of repetitions, between the second and third nominal repetitions of the first set of repetitions, and so forth. Similarly, the second time gap may be located between the first and second nominal repetitions of the second set of repetitions, between the second and third nominal repetitions of the second set of repetitions, and so forth.

Accordingly, the UE 120 may transmit nominal repetitions of the first set of repetitions interleaved with nominal repetitions of the second set of repetitions. That is, the UE 120 may transmit nominal repetitions of the first set of repetitions in time gaps between consecutive nominal repetitions of the second set of repetitions, and the UE 120 may transmit nominal repetitions of the second set of repetitions in time gaps between consecutive nominal repetitions of the first set of repetitions. As shown, nominal repetitions that cross a slot boundary may be transmitted as multiple actual repetitions, as described above.

As indicated above, FIG. 6 is provided as an example. Other examples may differ from what is described with respect to FIG. 6.

Figure 7:
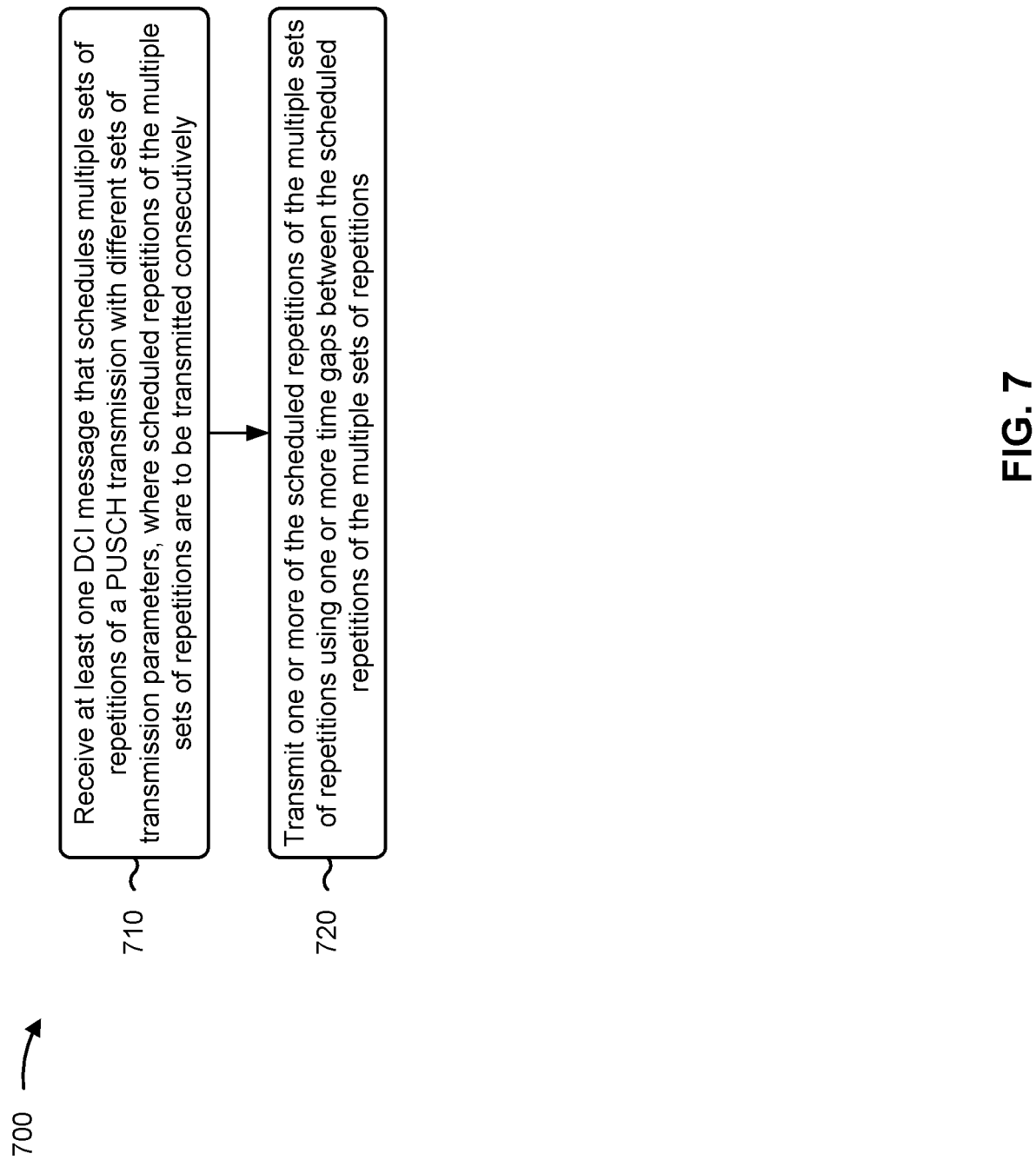
FIG. 7 is a diagram illustrating an example process associated with time gaps between PUSCH repetitions, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120) performs operations associated with time gaps between PUSCH repetitions.

As shown in FIG. 7, in some aspects, process 700 may include receiving at least one DCI message that schedules multiple sets of repetitions of a physical uplink shared channel transmission with different sets of transmission parameters, where scheduled repetitions of the multiple sets of repetitions are to be transmitted consecutively (block 710). For example, the UE (e.g., using reception component 802, depicted in FIG. 8) may receive at least one DCI message that schedules multiple sets of repetitions of a physical uplink shared channel transmission with different sets of transmission parameters, as described above. In some aspects, scheduled repetitions of the multiple sets of repetitions are to be transmitted consecutively.

As further shown in FIG. 7, in some aspects, process 700 may include transmitting one or more of the scheduled repetitions of the multiple sets of repetitions using one or more time gaps between the scheduled repetitions of the multiple sets of repetitions (block 720). For example, the UE (e.g., using transmission component 804, depicted in FIG. 8) may transmit one or more of the scheduled repetitions of the multiple sets of repetitions using one or more time gaps between the scheduled repetitions of the multiple sets of repetitions, as described above.

Process 700 may include additional aspects, such as any single aspect or any combination of aspects described below and/or in connection with one or more other processes described elsewhere herein.

In a first aspect, process 700 includes determining (e.g., using determination component 808) a duration for the one or more time gaps.

In a second aspect, alone or in combination with the first aspect, process 700 includes receiving (e.g., using reception component 802), via RRC signaling, a configuration that indicates a duration for the one or more time gaps.

In a third aspect, alone or in combination with one or more of the first and second aspects, the at least one DCI message includes an indication of a duration for the one or more time gaps.

In a fourth aspect, alone or in combination with one or more of the first through third aspects, the indication is indicated by a TDRA identifier of the at least one DCI message.

In a fifth aspect, alone or in combination with one or more of the first through fourth aspects, process 700 includes determining (e.g., using determination component 808) locations for the one or more time gaps.

In a sixth aspect, alone or in combination with one or more of the first through fifth aspects, the one or more time gaps are located between consecutive scheduled repetitions of the multiple sets of repetitions.

In a seventh aspect, alone or in combination with one or more of the first through sixth aspects, the one or more time gaps are located between consecutive scheduled repetitions, of the multiple sets of repetitions, that are to be transmitted using the different sets of transmission parameters.

In an eighth aspect, alone or in combination with one or more of the first through seventh aspects, the at least one DCI message includes a first DCI message received in a first CORESET associated with a first CORESET pool index, and a second DCI message received in a second CORESET associated with a second CORESET pool index, and the first DCI message schedules a first set of repetitions of the multiple sets of repetitions and the second DCI message schedules a second set of repetitions of the multiple sets of repetitions.

In a ninth aspect, alone or in combination with one or more of the first through eighth aspects, process 700 includes determining (e.g., using determination component 808) a first duration for the one or more time gaps for the first set of repetitions based at least in part on the first CORESET pool index, and a second duration for the one or more time gaps for the second set of repetitions based at least in part on the second CORESET pool index.

In a tenth aspect, alone or in combination with one or more of the first through ninth aspects, process 700 includes receiving (e.g., using reception component 802), via RRC signaling, a configuration that indicates a first duration for the one or more time gaps for the first CORESET pool index, and a second duration for the one or more time gaps for the second CORESET pool index.

In an eleventh aspect, alone or in combination with one or more of the first through tenth aspects, the first DCI message includes a first indication of a first duration for the one or more time gaps, and the second DCI message includes a second indication of a second duration for the one or more time gaps.

In a twelfth aspect, alone or in combination with one or more of the first through eleventh aspects, the first indication is indicated by a TDRA identifier of the first DCI message, and the second indication is indicated by a TDRA identifier of the second DCI message.

In a thirteenth aspect, alone or in combination with one or more of the first through twelfth aspects, process 700 includes determining (e.g., using determination component

808) the first duration based at least in part on the first indication and the first CORESET pool index, and the second duration based at least in part on the second indication and the second CORESET pool index.

In a fourteenth aspect, alone or in combination with one or more of the first through thirteenth aspects, a first duration for the one or more time gaps for the first set of repetitions corresponds to a duration of a scheduled repetition of the second set of repetitions, and a second duration for the one or more time gaps for the second set of repetitions corresponds to a duration of a scheduled repetition of the first set of repetitions.

In a fifteenth aspect, alone or in combination with one or more of the first through fourteenth aspects, the first duration corresponds to the duration of the scheduled repetition of the second set of repetitions and a duration for beam switching, and the second duration corresponds to the duration of the scheduled repetition of the first set of repetitions and the duration for beam switching.

In a sixteenth aspect, alone or in combination with one or more of the first through fifteenth aspects, the one or more time gaps are between consecutive scheduled repetitions of the first set of repetitions and the second set of repetitions.

In a seventeenth aspect, alone or in combination with one or more of the first through sixteenth aspects, process 700 includes receiving (e.g., using reception component 802) an indication of locations for the one or more time gaps in the first set of repetitions and the second set of repetitions.

In an eighteenth aspect, alone or in combination with one or more of the first through seventeenth aspects, process 700 includes receiving (e.g., using reception component 802) an indication of respective durations for the one or more time gaps for each pair of consecutive scheduled repetitions of the first set of repetitions and the second set of repetitions.

In a nineteenth aspect, alone or in combination with one or more of the first through eighteenth aspects, the scheduled repetitions of the first set of repetitions are transmitted interleaved with the scheduled repetitions of the second set of repetitions.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
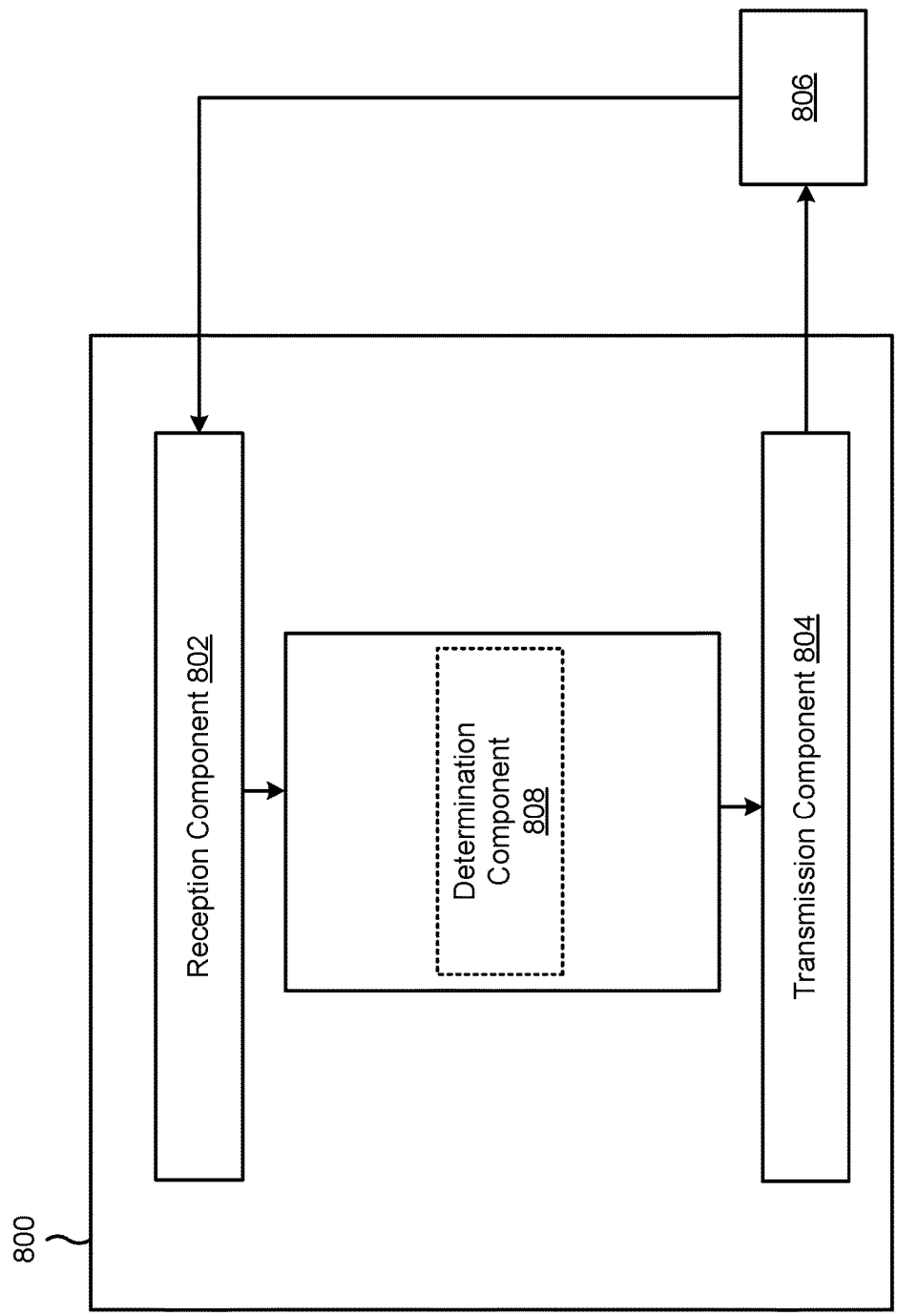
FIG. 8 is a diagram illustrating an example apparatus for wireless communication, in accordance with various aspects of the present disclosure.

FIG. 8 is a diagram illustrating an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, a TRP, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIGS. 5-6. Additionally or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be collocated with the reception component 802 in a transceiver.

The reception component 802 may receive at least one DCI message that schedules multiple sets of repetitions of a physical uplink shared channel transmission with different sets of transmission parameters. In some aspects, scheduled repetitions of the multiple sets of repetitions are to be transmitted consecutively. The transmission component 804 may transmit one or more of the scheduled repetitions of the multiple sets of repetitions using one or more time gaps between the scheduled repetitions of the multiple sets of repetitions.

The determination component 808 may determine a duration for the one or more time gaps. In some aspects, the determination component 808 may include a controller/processor, a memory, or a combination thereof, of the UE described above in connection with FIG. 2.

The reception component 802 may receive, via RRC signaling, a configuration that indicates a duration for the one or more time gaps.

The determination component 808 may determine locations for the one or more time gaps.

The determination component 808 may determine a first duration for the one or more time gaps for the first set of repetitions based at least in part on the first CORESET pool index, and a second duration for the one or more time gaps for the second set of repetitions based at least in part on the second CORESET pool index.

The reception component 802 may receive, via RRC signaling, a configuration that indicates a first duration for the one or more time gaps for the first CORESET pool index, and a second duration for the one or more time gaps for the second CORESET pool index.

The determination component 808 may determine the first duration based at least in part on the first indication and the first CORESET pool index, and the second duration based at least in part on the second indication and the second CORESET pool index.

The reception component 802 may receive an indication of locations for the one or more time gaps in the first set of repetitions and the second set of repetitions.

The reception component 802 may receive an indication of respective durations for the one or more time gaps for each pair of consecutive scheduled repetitions of the first set of repetitions and the second set of repetitions.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving at least one downlink control information (DCI) message that schedules multiple sets of repetitions of a physical uplink shared channel transmission with different sets of transmission parameters,
      wherein scheduled repetitions of the multiple sets of repetitions are to be transmitted consecutively; and
   transmitting a first set of repetitions associated with a first set of transmission parameters consecutively and a second set of repetitions associated with a second set of transmission parameters consecutively using a time gap between the scheduled first set of repetitions and the second set of repetitions,
      wherein the first set of transmission parameters identifies one or more of a first beam or a first power control parameter and the second set of transmission parameters identifies one or more of a second beam or a second power control parameter.

2. The method of claim 1, further comprising:
   determining a duration for one or more time gaps including the time gap.

3. The method of claim 1, further comprising:
   receiving, via radio resource control signaling, a configuration that indicates a duration for one or more time gaps including the time gap.

4. The method of claim 1, wherein the at least one DCI message includes an indication of a duration for one or more time gaps including the time gap, and
   wherein the indication is indicated by a time domain resource allocation identifier of the at least one DCI message.

5. The method of claim 1, further comprising:
   determining locations for one or more time gaps including the time gap.

6. The method of claim 1, wherein one or more time gaps are located between consecutive scheduled repetitions of the first set of repetitions.

7. The method of claim 1, wherein one or more time gaps are located between consecutive scheduled repetitions of the second set of repetitions.

8. The method of claim 1, wherein the at least one DCI message includes a first DCI message received in a first control resource set (CORESET) associated with a first CORESET pool index, and a second DCI message received in a second CORESET associated with a second CORESET pool index, and
wherein the first DCI message schedules the first set of repetitions and the second DCI message schedules the second set of repetitions.

9. The method of claim 8, further comprising:
determining a first duration for one or more first time gaps for the first set of repetitions based at least in part on the first CORESET pool index, and a second duration for one or more second time gaps for the second set of repetitions based at least in part on the second CORESET pool index.

10. The method of claim 8, further comprising:
receiving, via radio resource control signaling, a configuration that indicates a first duration for one or more first time gaps for the first CORESET pool index, and a second duration for one or more second time gaps for the second CORESET pool index.

11. The method of claim 8, wherein the first DCI message includes a first indication of a first duration for one or more first time gaps, and the second DCI message includes a second indication of a second duration for one or more second time gaps, and
wherein the first indication is indicated by a time domain resource allocation identifier of the first DCI message, and the second indication is indicated by a time domain resource allocation identifier of the second DCI message.

12. The method of claim 11, further comprising:
determining the first duration based at least in part on the first indication and the first CORESET pool index, and the second duration based at least in part on the second indication and the second CORESET pool index.

13. The method of claim 8, wherein a first duration for one or more first time gaps for the first set of repetitions corresponds to a duration of a scheduled repetition of the second set of repetitions, and a second duration for one or more second time gaps for the second set of repetitions corresponds to a duration of a scheduled repetition of the first set of repetitions, and
wherein the first duration corresponds to the duration of the scheduled repetition of the second set of repetitions and a duration for beam switching, and the second duration corresponds to the duration of the scheduled repetition of the first set of repetitions and the duration for beam switching.

14. The method of claim 8, further comprising:
receiving an indication of locations for one or more time gaps in the first set of repetitions and the second set of repetitions.

15. The method of claim 8, further comprising:
receiving an indication of respective durations for one or more time gaps for each pair of consecutive scheduled repetitions of the first set of repetitions and the second set of repetitions.

16. The method of claim 1, wherein the first set of transmission parameters identify a first precoding and the second set of transmission parameters identify a second precoding.

17. A user equipment (UE) for wireless communication, comprising:
one or more memories; and
one or more processors operatively coupled to the one or more memories, the one or more memories and the one or more processors configured to:
receive at least one downlink control information (DCI) message that schedules multiple sets of repetitions of a physical uplink shared channel transmission with different sets of transmission parameters,
wherein scheduled repetitions of the multiple sets of repetitions are to be transmitted consecutively; and
transmit a first set of repetitions associated with a first set of transmission parameters consecutively and a second set of repetitions associated with a second set of transmission parameters consecutively using a time gap between the first set of repetitions and the second set of repetitions,
wherein the first set of transmission parameters identifies one or more of a first beam or a first power control parameter and the second set of transmission parameters identifies one or more of a second beam or a second power control parameter.

18. The UE of claim 17, wherein the one or more processors are further configured to:
determine a duration for one or more time gaps including the time gap.

19. The UE of claim 17, wherein the one or more processors are further configured to:
receive, via radio resource control signaling, a configuration that indicates a duration for one or more time gaps including the time gap.

20. The UE of claim 17, wherein the at least one DCI message includes an indication of a duration for one or more time gaps including the time gap, and
wherein the indication is indicated by a time domain resource allocation identifier of the at least one DCI message.

21. The UE of claim 17, wherein the one or more processors are further configured to:
determine locations for one or more time gaps including the time gap.

22. The UE of claim 17, wherein one or more time gaps are located between consecutive scheduled repetitions of the first set of repetitions.

23. The UE of claim 17, wherein one or more time gaps are located between consecutive scheduled repetitions of the second set of repetitions.

24. The UE of claim 17, wherein the at least one DCI message includes a first DCI message received in a first control resource set (CORESET) associated with a first CORESET pool index, and a second DCI message received in a second CORESET associated with a second CORESET pool index, and
wherein the first DCI message schedules the first set of repetitions and the second DCI message schedules the second set of repetitions.

25. The UE of claim 24, wherein the one or more processors are further configured to:
determine a first duration for one or more first time gaps for the first set of repetitions based at least in part on the first CORESET pool index, and a second duration for one or more second time gaps for the second set of repetitions based at least in part on the second CORESET pool index.

26. The UE of claim 24, wherein the one or more processors are further configured to:
receive, via radio resource control signaling, a configuration that indicates a first duration for one or more first time gaps for the first CORESET pool index, and a second duration for one or more second time gaps for the second CORESET pool index.

27. The UE of claim 24, wherein the first DCI message includes a first indication of a first duration for one or more first time gaps, and the second DCI message includes a second indication of a second duration for one or more second time gaps, and
wherein the first indication is indicated by a time domain resource allocation identifier of the first DCI message, and the second indication is indicated by a time domain resource allocation identifier of the second DCI message.

28. The UE of claim 27, wherein the one or more processors are further configured to:
determine the first duration based at least in part on the first indication and the first CORESET pool index, and the second duration based at least in part on the second indication and the second CORESET pool index.

29. The UE of claim 24, wherein a first duration for one or more first time gaps for the first set of repetitions corresponds to a duration of a scheduled repetition of the second set of repetitions, and a second duration for one or more second time gaps for the second set of repetitions corresponds to a duration of a scheduled repetition of the first set of repetitions, and
wherein the first duration corresponds to the duration of the scheduled repetition of the second set of repetitions and a duration for beam switching, and the second duration corresponds to the duration of the scheduled repetition of the first set of repetitions and the duration for beam switching.

30. The UE of claim 24, wherein the one or more processors are further configured to:
receive an indication of locations for one or more time gaps in the first set of repetitions and the second set of repetitions.

31. The UE of claim 24, wherein the one or more processors are further configured to:
receive an indication of respective durations for one or more time gaps for each pair of consecutive scheduled repetitions of the first set of repetitions and the second set of repetitions.

32. The UE of claim 17, wherein the first set of transmission parameters identifies a first precoding and the second set of transmission parameters identifies a second precoding.

33. A non-transitory computer-readable medium storing a set of instructions for wireless communication, the set of instructions comprising:
one or more instructions that, when executed by one or more processors of a user equipment (UE), cause the UE to:
receive at least one downlink control information (DCI) message that schedules multiple sets of repetitions of a physical uplink shared channel transmission with different sets of transmission parameters,
wherein scheduled repetitions of the multiple sets of repetitions are to be transmitted consecutively; and
transmit a first set of repetitions associated with a first set of transmission parameters consecutively and a second set of repetitions associated with a second set of transmission parameters consecutively using a time gap between the first set of repetitions and the second set of repetitions,
wherein the first set of transmission parameters identifies one or more of a first beam or a first power control parameter and the second set of transmission parameters identifies one or more of a second beam or a second power control parameter.

34. An apparatus for wireless communication, comprising:
means for receiving at least one downlink control information (DCI) message that schedules multiple sets of repetitions of a physical uplink shared channel transmission with different sets of transmission parameters,
wherein scheduled repetitions of the multiple sets of repetitions are to be transmitted consecutively; and
means for transmitting a first set of repetitions associated with a first set of transmission parameters consecutively and a second set of repetitions associated with a second set of transmission parameters consecutively using a time gap between the first set of repetitions and the second set of repetitions,
wherein the first set of transmission parameters identifies one or more of a first beam or a first power control parameter and the second set of transmission parameters identifies one or more of a second beam or a second power control parameter.

\* \* \* \* \*